(12) United States Patent
Schindler et al.

(10) Patent No.: US 7,902,694 B2
(45) Date of Patent: Mar. 8, 2011

(54) DYNAMIC CURRENT LIMITS

(75) Inventors: Frederick R. Schindler, Sunnyvale, CA (US); Anoop Vetteth, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 242 days.

(21) Appl. No.: 11/937,254

(22) Filed: Nov. 8, 2007

(65) Prior Publication Data

US 2009/0121548 A1 May 14, 2009

(51) Int. Cl.
  *G06F 1/26* (2006.01)
  *H02J 1/00* (2006.01)
(52) U.S. Cl. ............... 307/24; 307/31; 307/35
(58) Field of Classification Search .......... 307/24, 307/31, 35
See application file for complete search history.

(56) References Cited

U.S. PATENT DOCUMENTS

| | | | |
|---|---|---|---|
| 6,817,890 B1 | 11/2004 | Schindler | |
| 6,972,415 B2 * | 12/2005 | Schaible et al. | 250/436 |
| 7,026,730 B1 | 4/2006 | Marshall et al. | |
| 7,353,407 B2 * | 4/2008 | Diab et al. | 713/300 |
| 7,356,588 B2 * | 4/2008 | Stineman et al. | 709/224 |
| 7,363,525 B2 | 4/2008 | Biederman et al. | |
| 7,368,798 B2 * | 5/2008 | Camagna et al. | 257/499 |
| 7,373,528 B2 | 5/2008 | Schindler | |
| 7,373,532 B2 | 5/2008 | Schindler | |
| 7,400,062 B2 * | 7/2008 | Pincu et al. | 307/29 |
| 7,451,329 B2 | 11/2008 | Schindler | |
| 7,472,290 B2 * | 12/2008 | Diab et al. | 713/300 |
| 7,478,251 B1 * | 1/2009 | Diab et al. | 713/300 |
| 7,500,118 B2 * | 3/2009 | Crawley et al. | 713/300 |
| 7,511,515 B2 * | 3/2009 | Herbold | 324/691 |
| 7,516,340 B2 * | 4/2009 | Landry et al. | 713/300 |
| 7,560,825 B2 * | 7/2009 | Crawley | 307/1 |
| 7,565,555 B2 * | 7/2009 | Diab | 713/300 |
| 7,567,579 B2 * | 7/2009 | Korcharz et al. | 370/401 |
| 7,571,331 B2 * | 8/2009 | Ohana et al. | 713/300 |
| 7,577,104 B2 * | 8/2009 | Karam et al. | 370/252 |
| 7,586,840 B2 * | 9/2009 | Karam | 370/216 |
| 7,607,033 B2 * | 10/2009 | Diab et al. | 713/300 |
| 7,620,825 B2 * | 11/2009 | Camagna et al. | 713/300 |
| 7,647,510 B2 * | 1/2010 | Landry et al. | 713/300 |
| 7,650,519 B1 * | 1/2010 | Hobbs et al. | 713/300 |

(Continued)

OTHER PUBLICATIONS

International Search Report and Written Opinion from PCT/US2008/82316, mailed on Dec. 29, 2008.

(Continued)

*Primary Examiner* — Jared J Fureman
*Assistant Examiner* — Adi Amrany
(74) *Attorney, Agent, or Firm* — BainwoodHuang (57) ABSTRACT

A method is provided for allocating and providing power to network devices. The method includes (i) receiving an electronic request to power a network device with a requested amount of power, (ii) establishing a worst-case current draw of the device in the event of a pre-defined maximum voltage slew rate, and (iii) selectively (a) allocating and providing power to the device when a remaining power capacity is greater than or equal to a provision voltage multiplied by the worst-case current draw of the device in the event of the maximum voltage slew rate, and (b) denying power to the device when the remaining power capacity is less than the provision voltage multiplied by the worst-case current draw of the device in the event of the maximum voltage slew rate. Apparatus are also provided for performing the method.

20 Claims, 7 Drawing Sheets

U.S. PATENT DOCUMENTS

| | | | |
|---|---|---|---|
| 2005/0207131 A1 | 9/2005 | Prokofiev et al. | |
| 2005/0262364 A1* | 11/2005 | Diab et al. | 713/300 |
| 2006/0080573 A1 | 4/2006 | Biederman et al. | |
| 2006/0082220 A1 | 4/2006 | Karam et al. | |
| 2006/0218422 A1* | 9/2006 | Camagna et al. | 713/300 |
| 2007/0011547 A1* | 1/2007 | Karam | 714/746 |
| 2007/0133238 A1* | 6/2007 | Herbold | 363/63 |
| 2007/0135086 A1* | 6/2007 | Stanford | 455/402 |
| 2007/0174527 A1* | 7/2007 | Vorenkamp | 710/100 |
| 2007/0189495 A1* | 8/2007 | Crawley et al. | 379/323 |
| 2007/0206774 A1 | 9/2007 | Vorenkamp et al. | |
| 2007/0257780 A1* | 11/2007 | Schindler | 340/310.11 |
| 2008/0013243 A1* | 1/2008 | Gammel et al. | 361/118 |
| 2008/0037188 A1* | 2/2008 | Wilson et al. | 361/56 |
| 2008/0040625 A1* | 2/2008 | Vorenkamp et al. | 713/340 |
| 2008/0062586 A1* | 3/2008 | Apfel | 361/18 |
| 2008/0104427 A1* | 5/2008 | Yee et al. | 713/300 |
| 2008/0137759 A1* | 6/2008 | Cai et al. | 375/257 |
| 2008/0144241 A1* | 6/2008 | Crawley et al. | 361/56 |
| 2008/0151457 A1* | 6/2008 | Apfel | 361/111 |
| 2008/0181316 A1* | 7/2008 | Crawley et al. | 375/258 |
| 2008/0252307 A1 | 10/2008 | Schindler | |
| 2009/0055672 A1* | 2/2009 | Burkland et al. | 713/340 |
| 2009/0100275 A1* | 4/2009 | Chang et al. | 713/300 |
| 2009/0121548 A1* | 5/2009 | Schindler et al. | 307/39 |

OTHER PUBLICATIONS

Schindler et al., "Network-Centric Scheduled Power Provisioning Method," U.S. Appl. No. 12/199,986, filed on Aug. 28, 2008.

Vetteth et al., "Classification Technique for Powered Devices Using Selective Frequency Filtering," U.S. Appl. No. 11/827,303, filed on Jul. 11, 2007.

* cited by examiner

DYNAMIC CURRENT LIMITS

TECHNICAL FIELD

The present disclosure relates generally to power provisioning, and more particularly to providing power to network devices.

BACKGROUND

Power over Ethernet (PoE) (according to the IEEE 802.3-2005 standard) provides a means for network devices to be powered over the network cabling. In a typical PoE configuration, several PoE Powered Devices (PDs) are powered by Power Sourcing Equipment (PSE). Each PD is often allocated the maximum power allowed by the specification (approximately 12.95 Watts, drawing up to 350 mA of current over a twisted pair connection at between 44 and 57 Volts—note that the cable introduces some power dissipation due to resistance, so the amount of power supplied by the PSE is about 15.4 W at 44 V). Thus, for example, a PSE having a 154 W power supply is able to power 10 PDs allocated 12.95 W each.

It sometimes happens that a voltage spike (or any sort of rapid voltage change) can occur, where the voltage of the PSE increases by a small amount very rapidly. Because PDs typically contain capacitors, the rapid voltage change causes the capacitors to charge and therefore draw excess current. Because a power supply is typically able to provide 115% of its stated power capacity for brief periods of time (e.g., 50 ms), a brief 15% increase in current is acceptable. Since PoE per-port current is usually limited to 400 mA, however, a voltage spike will not damage the power supply because 400 mA of current is less than 15% more than the 350 mA allocated to each port.

The newer IEEE 802.3at (also known as PoE+) draft standard increases the power available over the traditional PoE. Thus, according to one proposal, each port can provide 720 mA of continuous current, permitting excursions of up to approximately 15% more current. However, most PoE+ implementations thus far have limited the per-port current to less than 820 mA. Thus, if all devices are allocated 720 mA, a voltage spike will typically not cause a failure because 820 mA is approximately 15% more than 720 mA. Some pre-standard PoE+ implementations are configurable to have varying current limits because the PoE+ standard has not yet been completed. Thus, for example, some such implementations allow the current limit to be changed to comply with the specification once finalized (by a flash hardware update or reprogramming).

BRIEF DESCRIPTION OF THE DRAWINGS

Objects, features, and advantages of particular embodiments of the invention will be apparent from the following description, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

Various embodiments are provided for allocating and providing power to network devices, while ensuring that a power supply is not overburdened by current increases due to voltage spikes.

One embodiment is a method for allocating and providing power to a network device. The method includes (i) receiving an electronic request to power a network device with a requested amount of power, (ii) establishing a worst-case current draw of the device in the event of a pre-defined maximum voltage slew rate, and (iii) selectively (a) allocating and providing power to the device when a remaining power capacity is greater than or equal to a provision voltage multiplied by the worst-case current draw of the device in the event of the maximum voltage slew rate, and (b) denying power to the device when the remaining power capacity is less than the provision voltage multiplied by the worst-case current draw of the device in the event of the maximum voltage slew rate.

Another embodiment is an apparatus for a powered device. The apparatus includes a network interface, a power supply, and a controller coupled to the network interface. The power supply includes a capacitor having a capacitance. The controller is coupled to the network interface. The controller is configured to (a) send a request to power sourcing equipment, over the network interface, to be provided a particular amount of power over the network interface, the power to be provided to the local power supply, and (b) report, over the network interface, the capacitance to the power sourcing equipment.

Another embodiment is an apparatus for powered source equipment. The apparatus includes a power supply, a network interface, and a controller. The power supply has a provision voltage and a remaining power capacity. The controller is coupled to the network interface. The controller is configured to (i) receive, over the network interface, a request to power a device over the network interface with a requested amount of power, (ii) establish a worst-case current draw of the device in the event of a pre-defined maximum voltage slew rate, and (iii) selectively (a) allocate and provide power to the device from the power supply over the network interface when the remaining power capacity is greater than or equal to the provision voltage multiplied by the worst-case current draw of the device in the event of the maximum voltage slew rate, and (b) deny power to the device when the remaining power capacity is less than the provision voltage multiplied by the worst-case current draw of the device in the event of the maximum voltage slew rate.

Description of Example Embodiments

A common application of PoE is voice over IP (VOIP) telephony. Most VOIP telephones use less than 6 W of power. Thus, for example, in one possible PoE+ standard, in which a minimum of 50 V is provided at up to 720 mA, a VOIP phone might require 100 mA of current for 4.88 W of power (5.01 W at the PSE due to power losses over the cable).

Figure 1:
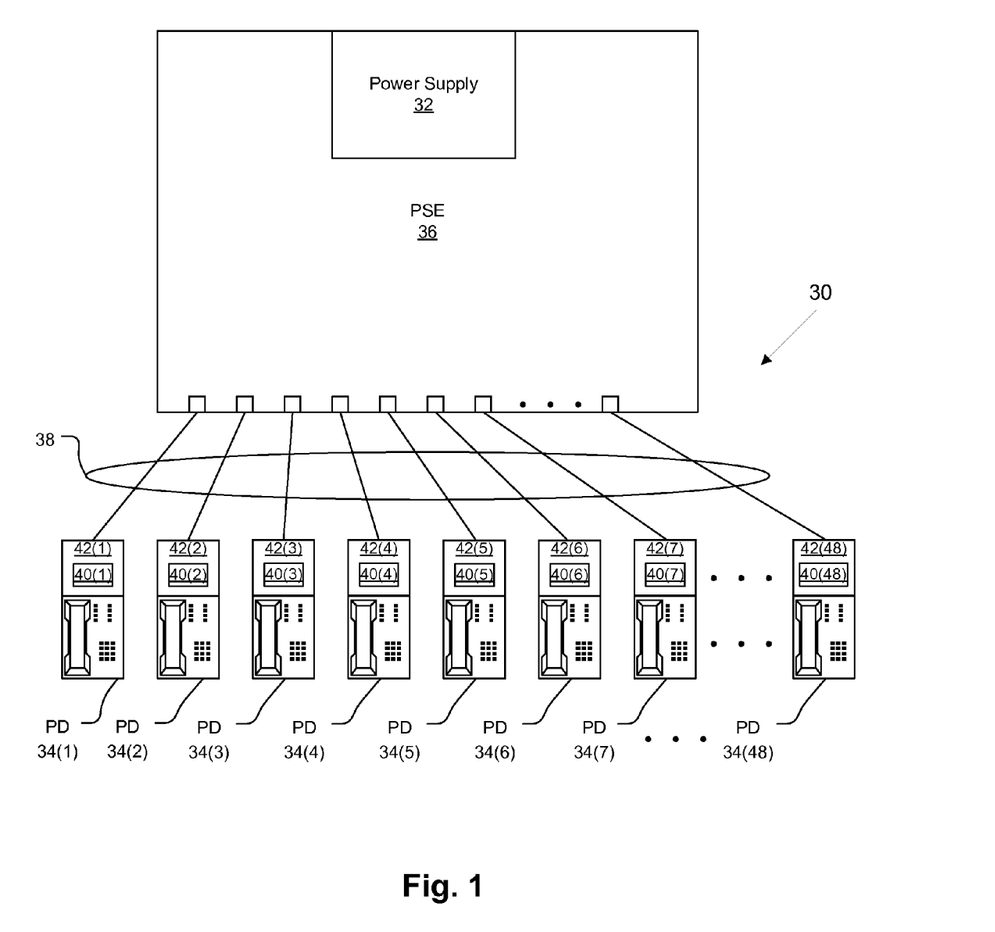
FIG. 1 illustrates an example system for use in practicing various embodiments.

Thus, as in the system 30 depicted in FIG. 1, a 240 W power supply 32 is enough to provide power to 48 such VOIP phones 34, each connected to PSE 36 over network cables 38.

However, if a voltage spike[1] affects the power supply 32 at the PSE 36, the current drawn by the VOIP phones 34 can momentarily increase and overload the system 30. For example, if each phone 34 is drawing 100 mA of current and each phone has a IEEE 802.3 standard 180 micro-Farad capacitor 40 in its internal power supply 42, then a voltage spike having a slew rate of 83.3 V/s is sufficient to cause each PD 34 to draw additional current from the PSE 36 bringing the total power requirement of the system 30 to 15% above the stated 240 W power capacity of the PSE power supply 32.[2] This is because the current, I, drawn by a charging capacitor with capacitance C is:

[1] The term "voltage spike" as used in this Disclosure refers to any rapid change in voltage.
[2] The slew rate as used throughout this Disclosure refers to the rate of change of voltage at the capacitor 40 of the PD 34. For short cable 38 lengths, this will be approximately the same as the slew rate at the PSE 36, but for long cable 38 lengths, the slew rate at the capacitor 40 may be less than the slew rate at the PSE 36.

$$I = C\frac{dv}{dt} \quad (1)$$

so:

$$I = 180 \ \mu F \times 83.3 \frac{V}{s} = 14{,}994 \ \mu A \approx 15.0 \ mA. \quad (2)$$

Thus, each PD 34 will momentarily draw 115 mA of current (which is well below the per-port current limit of, for example, 820 mA). At 50 V, this is 5.75 W per device or 276 W for 48 devices. However, 115% capacity of a 240 W power supply is also 276 W, so the power supply just meets this power demand. Exceeding the voltage slew rate used for this calculation (83.3 V/s) could therefore result in the power supply 32 shutting down, which could cause every PD 34 to shut down while the PSE 36 reboots, causing a delay while every PD 34 renegotiates its power needs. It is also possible that data could be lost if temporary data is stored in volatile memory of any of the phones 34 (such as, for example, the phone number of the previous caller).

In one embodiment, the PSE 36 only allocates as much power as could be drawn if every PD 34 drew extra current due to a largest-anticipated voltage slew rate. In some systems, voltage spikes having slew rates greater than 200 V/s are highly improbable, while in other systems voltage spikes with slew rates up to 950 V/s are possible. Thus, according to formula 1, given a 180 micro-Farad capacitance of capacitor 40 and a system with a 200 V/s maximum voltage slew rate, the increase in current draw due to the charging of the capacitor 40 could spike as high as:

$$I = 180 \ \mu F \times 200 \frac{V}{s} = 36{,}000 \ \mu A = 36 \ mA. \quad (3)$$

So, each PD 34 could momentarily draw 136 mA of current in the event of a largest-anticipated voltage spike of 200 V/s. Thus, if we assume that each phone 34 will not draw in excess of its standard operating current at the same time as the voltage spike, then 50 V×136 mA=6.8 W of power must be allocated to each PD 34, allowing only 40 such VOIP phones 34 to be powered by 240 W power supply 32 (with temporary capacity to supply 276 W).

However, if we assume that each phone 34 may momentarily draw more current (by up to 15%) at the same exact instant as the voltage spike (for example, if the phone 34 temporarily needs a short burst of additional power to deal with a complex call operation), then in order to avoid overloading the power supply, each phone 34 must be allocated 50 V×(136 mA+15 mA)=7.55 W. Thus, the 240 W power supply 32 (with temporary capacity to supply 276 W) would then be able to power only 36 such phones 34.

Figure 2:
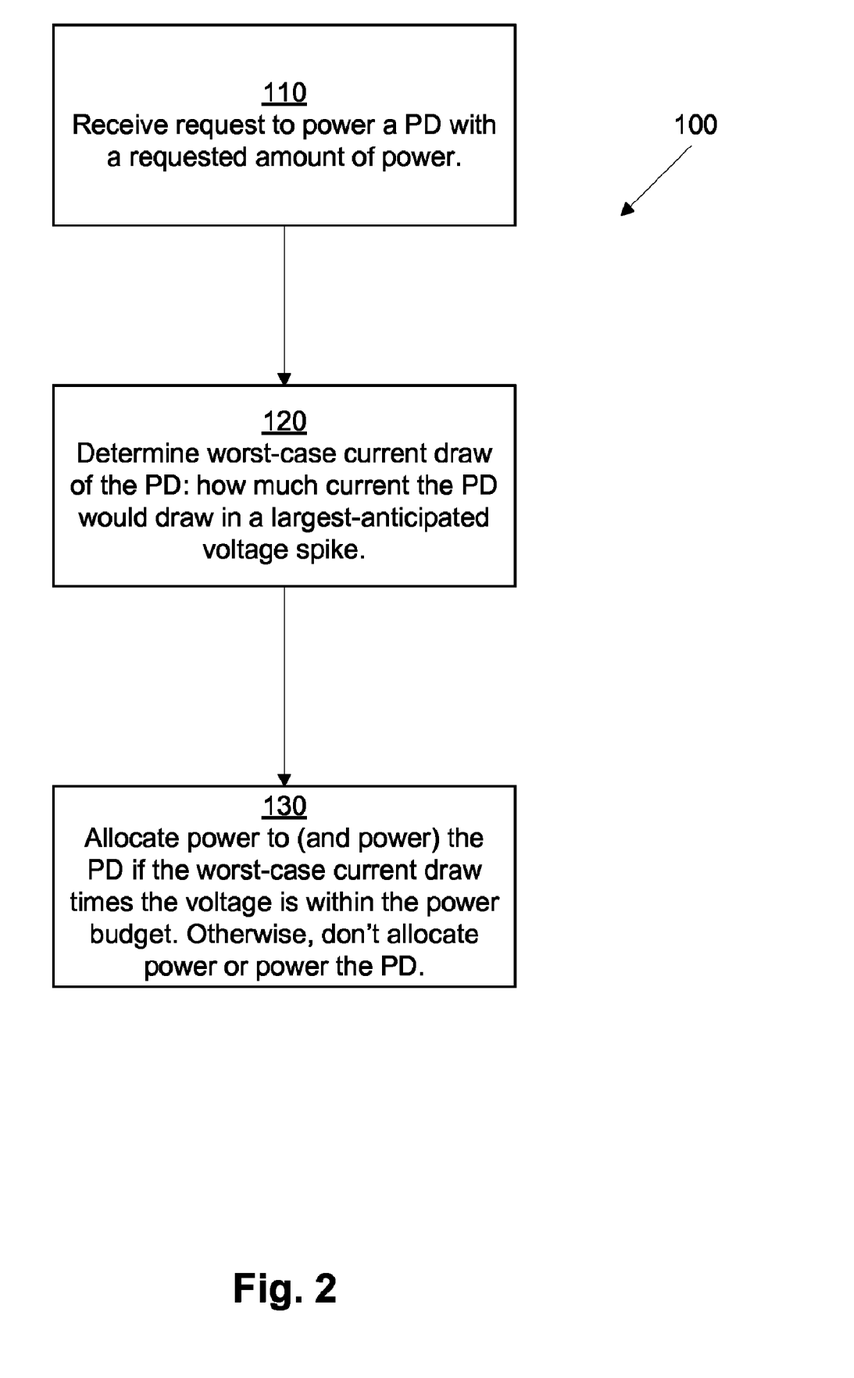
FIG. 2 illustrates an example method of one embodiment.

FIG. 2 depicts a method 100 that may be practiced in accordance with one embodiment to prevent a voltage spike from harming the system 30. In step 110, PSE 36 receives, over network cable 38, a request to power a particular PD 34 with a requested amount of power.

In order to determine if the power supply 32 has sufficient power to power the PD 34, the PSE 36 must determine exactly how much current the PD 34 could draw in the event of a largest-anticipated voltage spike (step 120). This may be done by multiplying the capacitance of capacitor 40 by the largest-anticipated voltage slew rate (e.g., 200 V/s) and adding that amount to the requested amount of power divided by the provision voltage to calculate a worst-case current draw of the PD 34. The largest-anticipated voltage slew rate is pre-programmed into the PSE 36, and its value represents the best reasonable guess of engineers as to the maximum voltage slew rate possible (or likely) in the device. In one embodiment, the PSE 36 assumes an IEEE standard 180 micro-Farads of capacitance. In another embodiment, the PD 34 reports the capacitance of its capacitor 40 to the PSE 36 for use in the above calculation.

The PSE 36 keeps track of a remaining power budget. If the worst-case current draw of the PD 34 times the provision voltage (e.g., 50 V) falls within the remaining power budget, then the PSE 36 allocates an amount of power equal to the worst-case current draw of the PD 34 times the provision voltage to the PD 34 and subtracts that amount from the remaining power budget to derive a new remaining power budget. Power can then be provided to the PD 34 as requested. However, if there is not enough power remaining in the power budget to power the device under a worst-case current draw, then no power is allocated or provided to the requesting PD 34 (step 130).

In another embodiment, the maximum current allowed over each port is limited to allow additional devices to be powered. Thus, for example, say that a PD 34 having a 100 mA current requirement can occasionally require a burst of 115% power. Thus, the PD could in some circumstances require 15% additional current, or 115 mA. However, power supplies 32 sometimes have a margin of error in the amount of current they actually provide. Thus, in order to ensure that the PD 34 actually receives the full 115 mA that it needs, a provision tolerance of the power supply (e.g., 8.7%) may be added to that amount. Thus some PSEs faced with a demand for 115 mA could supply an additional 10 mA. This amount would need to be able to pass over the cable 38. Thus, under normal circumstances (i.e., no voltage spike—when the voltage remains substantially constant, for example when the voltage slew rate is less than 5 V/s), each PD 34 could require 125 mA, so a current limit of 125 mA could safely be imposed on the cable 38 without under-powering the PD 34. Thus, if instead of allocating 136 mA to each device only 125 mA were allocated to each device (because the per-port current limit would prevent the current from ever actually exceeding 125 mA), then the 240 W power supply would be able to support more PDs 34. Indeed, 50 V×125 mA=6.25 W of power must be allocated to each PD 34, allowing 44 VOIP phones to be powered by 240 W power supply 32, since in this case the full 115% capacity of the power supply 32 may be used (instead of the 36 or 40 devices allowed by the previous embodiment).

Figure 3:
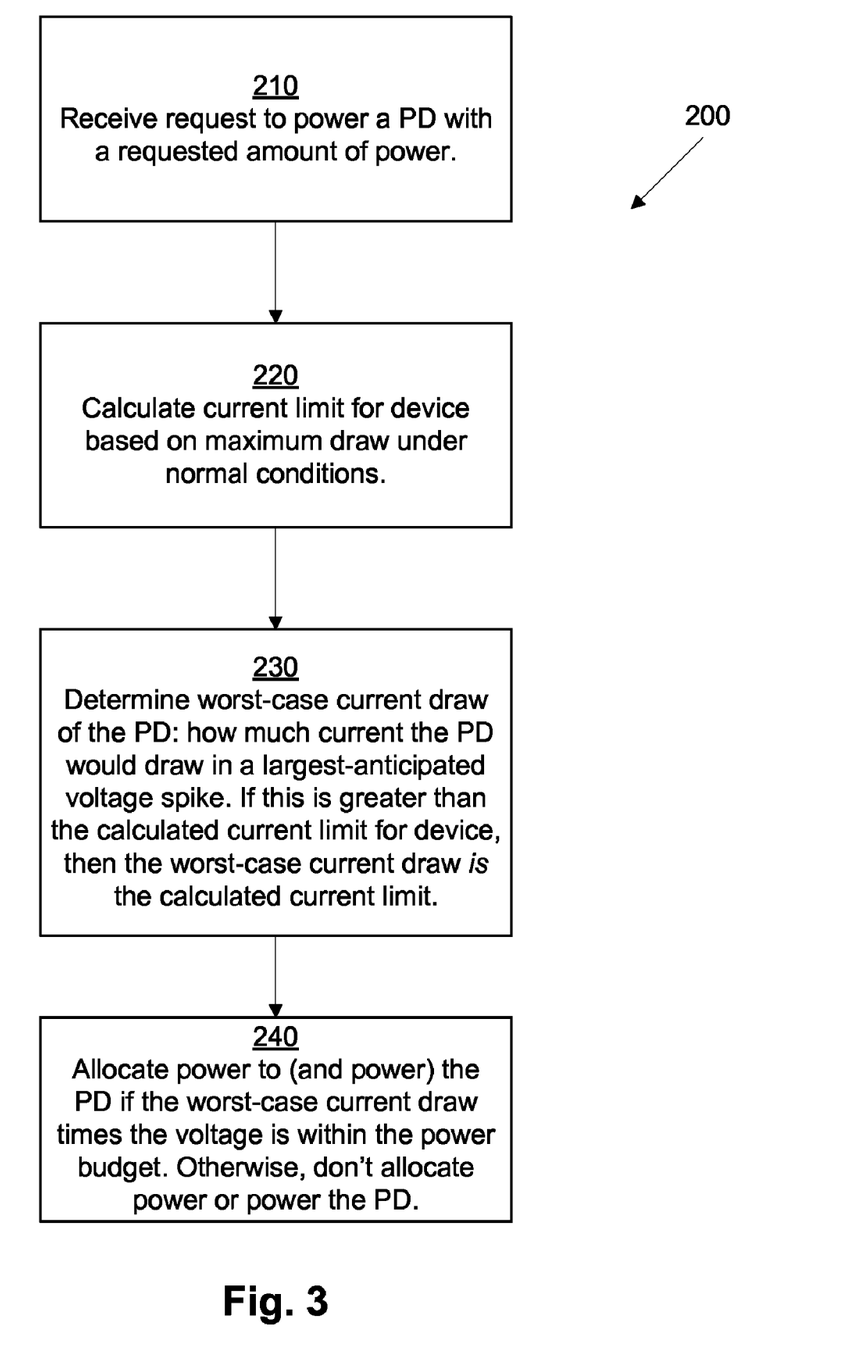
FIG. 3 illustrates an example method of another embodiment.

FIG. 3 depicts a method 200 that may be practiced in accordance with this embodiment to prevent a voltage spike from harming the system 30. In step 210, PSE 36 receives, over network cable 38, a request to power a particular PD 34 with a requested amount of power.

In step 220, a per-port current limit is calculated for the device. (Calculating is defined to be "ascertaining by computation." Calculation involves performing mathematical operations on one or more numerical inputs to produce one or more numerical outputs.) In one embodiment, the per-port current limit for the device is calculated by multiplying the requested amount of power divided by the provision voltage by a burst factor (for example, a number in the range of 1.0 to 1.15, representing the ratio of actual instantaneous burst current draw to average current draw for a device) and adding a provision tolerance (for example, 8.7%, but in any event in the range 0% to 20%, representing the accuracy of the power supply 32 circuitry in providing a specific amount of current). This calculated number should substantially be the per-port current limit, however, it may exceed this amount slightly, for example, by up to 5%. In another embodiment, the per-port current limit may instead be established by the PD 34 reporting the maximum amount of current it is configured to be capable of drawing under normal operating conditions (i.e., no voltage spike) and adding the provision tolerance. In either event, if the PD 34 is eventually powered by the PSE 36, then this per-port current limit will be implemented over the cable 38, either by the PD 34 or by the PSE 36. The calculations of step 220 may be performed either by the PD 34 or by the PSE 36.

In order to determine if the power supply 32 has sufficient power to power the PD 34, the PSE 36 must determine exactly how much current the PD 34 could draw in the event of a largest-anticipated voltage slew rate (step 230). This may be done by multiplying the capacitance of capacitor 40 by the largest-anticipated voltage slew rate (e.g., 200 V/s) and adding that amount to the requested amount of power divided by the provision voltage to calculate a worst-case current draw of the PD 34. In one embodiment, the PSE 36 assumes an IEEE standard 180 micro-Farads of capacitance. In another embodiment, the PD 34 reports the capacitance of its capacitor 40 to the PSE 36 for use in the above calculation. However, if this calculated worst-case current draw exceeds the per-port current limit of the PD 34 (as calculated above in step 220), then since the current draw can never exceed the per-port current limit, the worst-case current draw is capped (such as with a ceiling function) at the per-port current limit.

It should be understood that step 220 may be performed before step 230, or the two steps may be performed concurrently. In either event, the per-port current limit is actually implemented only once the device 34 has been powered (see step 240 below).

The PSE 36 keeps track of a remaining power budget. If the worst-case current draw of the PD 34 times the provision voltage (e.g., 50 V) falls within the remaining power budget, then the PSE 36 allocates an amount of power equal to the worst-case current draw of the PD 34 times the provision voltage to the PD 34 and subtracts that amount from the remaining power budget to derive a new remaining power budget. Power can then be provided to the PD 34 as requested. However, if there is not enough power remaining in the power budget to power the device 34 under a worst-case current draw, then no power is allocated or provided to the requesting PD 34 (step 240).

Figure 4:
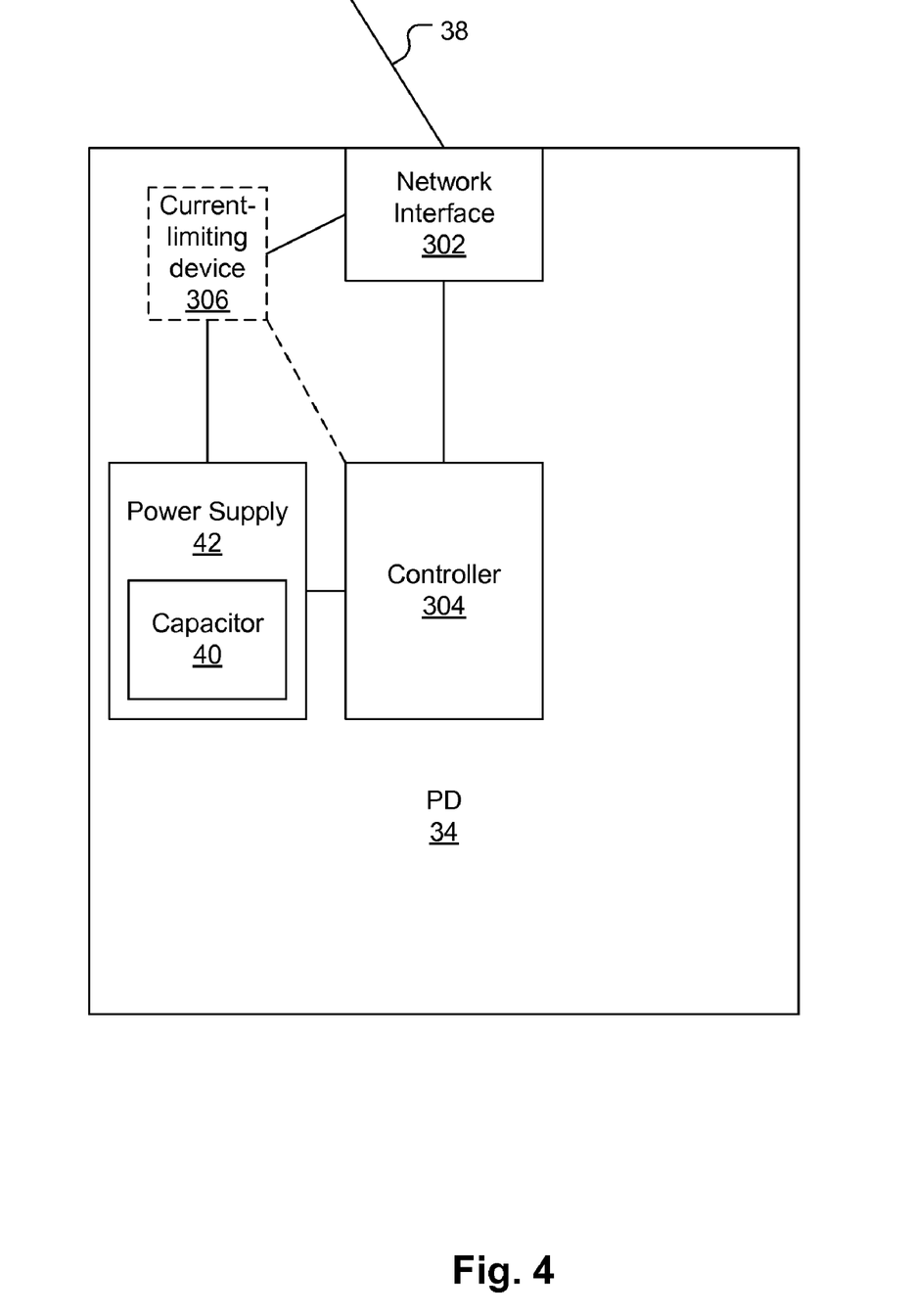
FIG. 4 illustrates an example apparatus of one embodiment.

FIG. 4 depicts an example PD 34. The PD 34 has a power supply 42, which includes a capacitor 40 with capacitance C. The PD 34 also has a network interface 302 which connects to network cable 38 and to a controller 304. During operation, the network interface 302 provides power (which it receives across the cable 38) to the power supply 42. In some embodiments, a current limiting device 306 interconnects the power supply 42 to the network interface 302. In other embodiments (for example, if the current-limiting is performed by the PSE 36 or if no current-limiting is performed at all), the power supply 42 couples to the network interface 302 without passing through a current limiting device 306. In some embodiments, the current limiting device 306 is also connected to the controller 304 so that it can be controlled in the event that the current limit changes as the power needs of the PD change.

Figure 5:
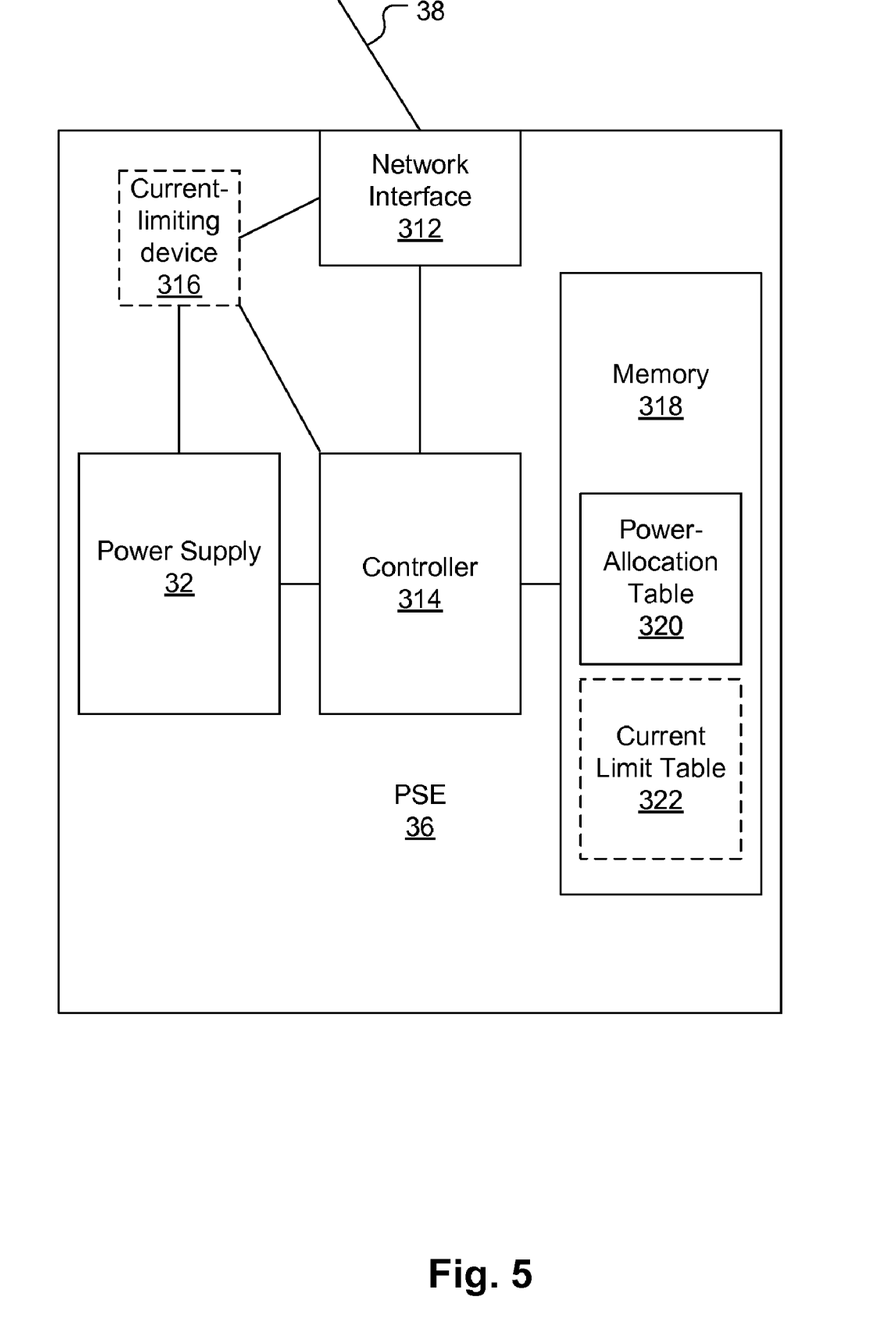
FIG. 5 illustrates an example apparatus of one embodiment.

FIG. 5 depicts an example PSE 36. The PSE 36 has a power supply 32 (which may be internal or external to the PSE 36). The PSE 36 also has a plurality of network interfaces 312 (only one of which is depicted) which connect to network cables 38. During operation, the network interface 312 receives power from the power supply 32 to send across the cable 38. The network interface 312 also couples to a controller 314. In some embodiments, a current limiting device 316 (note that there may be a plurality of current limiting devices 316—one connected to each network interface) interconnects the power supply 32 to the network interface 312. In other embodiments (for example, if the current-limiting is performed by the PD 34 or if no current-limiting is performed at all), the power supply 32 couples to the network interface 312 without passing through a current limiting device 316. The current limiting device 316 is also connected to the controller 314 so that it can be controlled so that a port-specific current limit can be set. The controller 314 connects to memory 318. Memory 318 stores a power-allocation table 320 to keep track of the amount of power allocated to each PD 34. In some embodiments, memory 318 also stores a current limit table 322 to keep track of the current limit assigned to each PD 34.

Figure 6:
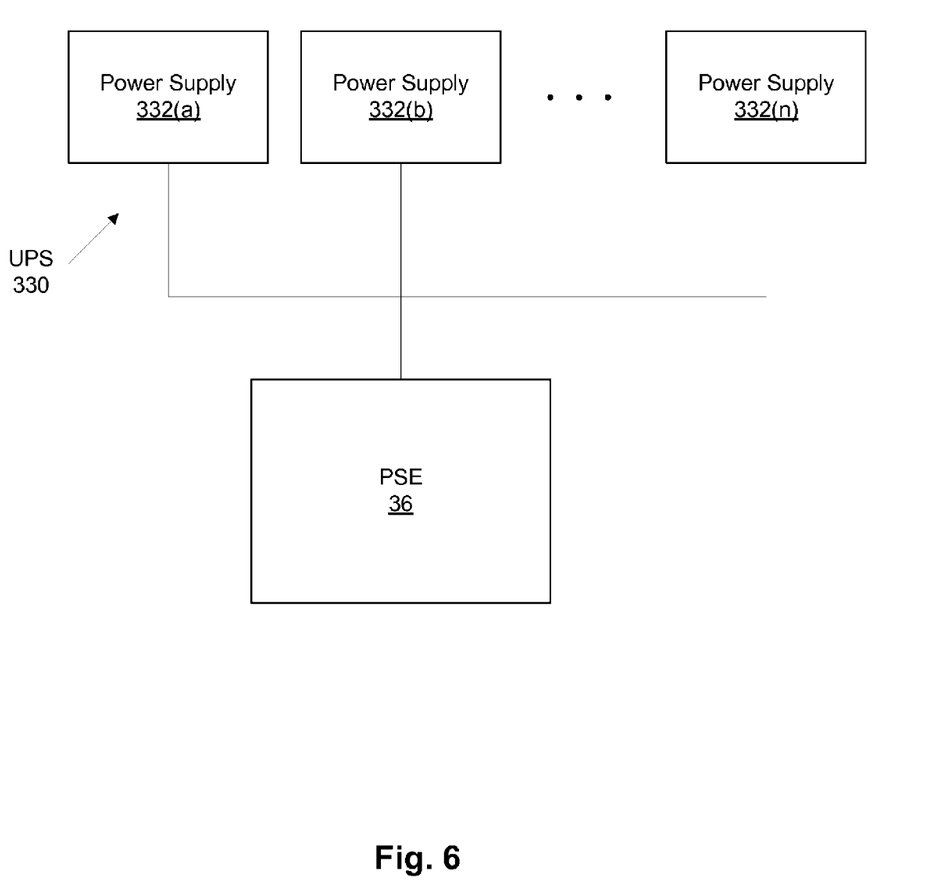
FIG. 6 illustrates an example system for use with various embodiments.

As depicted in FIG. 6, in some embodiments, the PSE 36 may connect to an uninterruptible power supply 330. The uninterruptible power supply 330 may include a plurality of redundant power supplies 332(a), 332(b), . . . 332(n). The uninterruptible power supply 330 is configured to report a power capacity such that even if one of the power supplies 332 were to fail, the total capacity of the uninterruptible power supply 330 would still be at least the reported capacity. The power supplies 332 may typically be utilized in a load-sharing approach, but should one of them fail, the remaining power supplies would be capable of providing the total amount of allocated power. When one of the power supplies 332 fails and the remaining ones ramp up their power, the uninterruptible power supply 330 may experience a temporary spike in voltage, thereby causing the capacitors 40 of the PDs 34 to draw more current. Embodiments, as described above, alleviate this problem.

Figure 7:
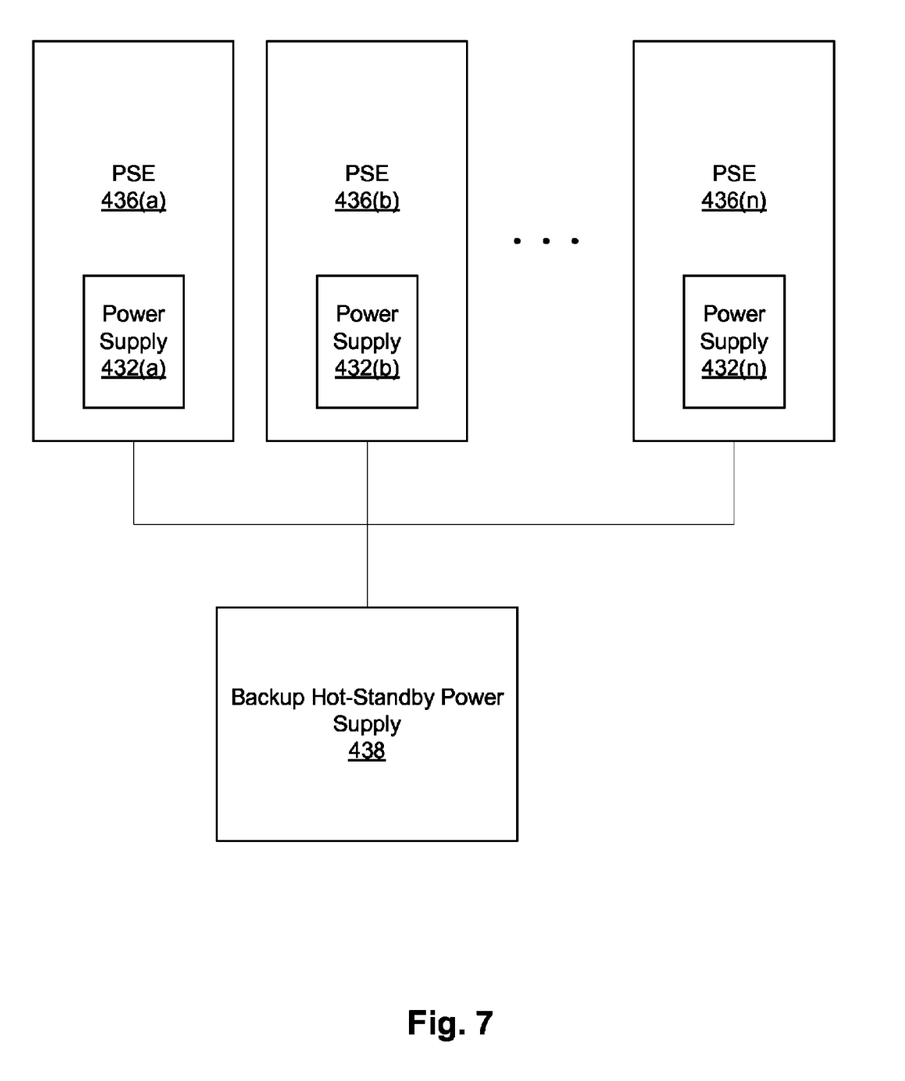
FIG. 7 illustrates an example system for use with various embodiments.

As depicted in FIG. 7, in some embodiments, the multiple PSEs 436(a), 436(b), . . . 436(n) may connect to a backup hot-standby power supply 438. In the event that the power supply 432 of one of the PSEs 436 fails, the backup hot-standby power supply 438 is electronically switched in a controlled manner to power the PSE 436 with the failed power supply 432. When this happens, the PSE 436 with the failed power supply 432 may experience a temporary spike in voltage, thereby causing the capacitors 40 of the PDs 34 to draw more current. Embodiments, as described above, alleviate this problem.

Thus, embodiments have been provided for powering low-powered PDs without over-drawing a power supply even in the event of a large voltage spike. Embodiments have also been provided for supporting an increased number of PDs even while preventing over-drawing the power supply.

While various embodiments of the invention have been particularly shown and described, it will be understood by those skilled in the art that various changes in form and details may be made therein without departing from the spirit and scope of the invention as defined by the appended claims.

For example, embodiments have been described in which the PDs 34 are VOIP telephones. However, the PDs 34 need not be VOIP telephones. They may be any sort of device that can receive power over a network, such as, for example, video cameras, motion detectors, etc.

As an additional example, embodiments have been described in which the power supply 32 has a 240 W power capacity, however, the power supply 32 may have any capacity, and is not limited to any particular capacity.

As an additional example, embodiments have been described in which the PSE 36 has 48 ports, however, the PSE 36 may have any number of powered ports, and is not limited to any particular number of powered ports.

As an additional example, embodiments have been described in which the PD 34 requests an amount of power to be provided by the PSE 36 (calculated by adding the amount of power the PD needs to the worst-case power loss across the cable 38 according to the standard). However, in some embodiments, the PD 34 requests the amount of power that the PD 34 needs. In such embodiments, any person having ordinary skill in the art would understand that some of the calculations would have to be modified to accommodate the different manner of reporting. Thus, for example, in performing step 120, determining exactly how much current the PD 34 could draw in the event of a largest-anticipated voltage spike would instead include multiplying the capacitance of capacitor 40 by the largest-anticipated voltage slew rate (e.g., 200 V/s) and adding that amount to the requested amount of power divided by the voltage received by the PD 34 (after the voltage has decreased due to the resistance of the cable 38) to calculate a worst-case current draw of the PD 34. Similar changes would be necessitated in steps 220 and 230 as well.

What is claimed is:

1. A method, performed in a network power sourcing apparatus having a power supply with a fixed power capacity, the network power sourcing apparatus providing power to a plurality of powered network devices at a provision voltage, the method comprising:
   receiving, at the network power sourcing apparatus, an electronic request to power a network device of the plurality of powered network devices with a requested amount of power;
   calculating, at the network power sourcing apparatus, a worst-case current draw of the network device in the event of a pre-defined maximum voltage slew rate, wherein the pre-defined maximum voltage slew rate is a value pre-programmed into the power sourcing apparatus to represent a largest-anticipated possible voltage slew rate;
   allocating and providing power, from the power supply to the network device when a remaining power capacity is greater than or equal to the provision voltage multiplied by the worst-case current draw of the network device in the event of the maximum voltage slew rate; and
   denying power from the power supply to the network device when the remaining power capacity is less than the provision voltage multiplied by the worst-case current draw of the device in the event of the maximum voltage slew rate;
   wherein the remaining power capacity is defined to be the fixed power capacity of the network power sourcing apparatus minus any power that has already been allocated to other powered network devices of the plurality of powered network devices.

2. A method as in claim 1 wherein calculating the worst-case current draw of the network device in the event of the pre-defined maximum voltage slew rate includes summing together the following amounts:
   the requested amount of power divided by the provision voltage; and
   a capacitance of a capacitor within the network device multiplied by the maximum voltage slew rate.

3. A method as in claim 2 wherein the pre-defined maximum voltage slew rate is 200 volts per second.

4. A method as in claim 2 wherein the capacitance of the capacitor within the network device is assumed to be a pre-determined value.

5. A method as in claim 2 wherein the method further comprises:
   receiving a signal from the network device indicating the capacitance of the capacitor within the device.

6. A method as in claim 2 wherein the requested amount of power divided by the provision voltage is less than the worst-case current draw of the device in the event of the maximum voltage slew rate.

7. A method as in claim 1 wherein:
   the method further includes:
      calculating a current limit for the network device, wherein calculating the current limit for the network device includes determining a maximum amount of current the network device is capable of drawing in the event that the provision voltage remains substantially constant, and adding a provision tolerance to that maximum amount; and
      substantially limiting the total amount of current capable of being provided to the network device to the calculated current limit for the network device; and
   calculating the worst-case current draw of the network device in the event of the maximum voltage slew rate includes calculating as the worst-case current draw of the network device in the event of the maximum voltage slew rate a number which is less than or equal to the calculated current limit for the network device.

8. A method as in claim 7 wherein determining the maximum amount of current the network device is capable of drawing in the event that the provision voltage remains substantially constant includes:
   establishing that the maximum amount of current the network device is capable of drawing in the event that the provision voltage remains substantially constant is the requested amount of power divided by the provision voltage multiplied by a burst factor, the burst factor being a number in the range of 1.0 to 1.15.

9. A method as in claim 7 wherein determining the maximum amount of current the network device is capable of drawing in the event that the provision voltage remains substantially constant includes:
   establishing that the maximum amount of current the network device is capable of drawing in the event that the provision voltage remains substantially constant is the largest amount of current that the network device is configured to be able to request under any circumstances.

10. A method as in claim 9 wherein establishing that the maximum amount of current the network device is capable of drawing in the event that voltage remains substantially constant is the largest amount of current that the network device is configured to be able to request under any circumstances includes receiving a signal from the network device reporting the largest amount of current that the network device is configured to be able to request under any circumstances.

11. A method as in claim 7 wherein adding the provision tolerance to the maximum amount includes:
adding the provision tolerance, the provision tolerance being equal to a percentage of the maximum amount of current the network device is capable of drawing in the event that the provision voltage remains substantially constant, the percentage being in the range of 0% to 20%.

12. A method as in claim 11 wherein the percentage is substantially 8.7%.

13. A method as in claim 1 wherein the requested amount of power divided by the provision voltage is less than or equal to 100 mA.

14. An apparatus comprising:
a power supply having a fixed power capacity, the power supply configured to provide power to a plurality of powered devices at a provision voltage, and a remaining power capacity;
a network interface; and
a controller coupled to the network interface, the controller being configured to:
receive, over the network interface, a request to power a device of the plurality of powered devices over the network interface with a requested amount of power;
calculate a worst-case current draw of the device in the event of a pre-defined maximum voltage slew rate, wherein the pre-defined maximum voltage slew rate is a value pre-programmed into the apparatus to represent a largest-anticipated possible voltage slew rate;
allocate and provide power to the device from the power supply over the network interface when the remaining power capacity is greater than or equal to the provision voltage multiplied by the worst-case current draw of the device in the event of the maximum voltage slew rate; and
deny power to the device when the remaining power capacity is less than the provision voltage multiplied by the worst-case current draw of the device in the event of the maximum voltage slew rate;
wherein the remaining power capacity is defined to be the fixed power capacity of the power supply minus any power that has already been allocated to other powered network devices of the plurality of powered network devices.

15. An apparatus as in claim 14 wherein the controller, when calculating the worst-case current draw of the device in the event of the maximum voltage slew rate, is operable to sum together the following amounts:
the requested amount of power divided by the provision voltage; and
a capacitance of a capacitor within the device multiplied by the maximum voltage slew rate.

16. An apparatus as in claim 15 wherein the controller is further configured to receive from the device, via the network interface, a signal indicating the capacitance of the capacitor within the device.

17. An apparatus as in claim 14 wherein:
the controller is further configured to:
calculate a current limit for the device, wherein calculating the current limit for the device includes determining a maximum amount of current the device is capable of drawing in the event that the provision voltage remains substantially constant, and adding a provision tolerance to that maximum amount; and
substantially limit the total amount of current capable of being provided to the device to the calculated current limit for the device; and
the controller, when calculating the worst-case current draw of the device in the event of the maximum voltage slew rate, is operable to calculate, as the worst-case current draw of the device in the event of the maximum voltage slew rate, a number which is less than or equal to the calculated current limit for the device.

18. An apparatus as in claim 17 wherein the controller, when determining the maximum amount of current the device is capable of drawing in the event that voltage remains substantially constant, is operable to:
establish that the maximum amount of current the device is capable of drawing in the event that the provision voltage remains substantially constant is the requested amount of power divided by the provision voltage multiplied by a burst factor, the burst factor being a number in the range of 1.0 to 1.15.

19. An apparatus as in claim 17 wherein the apparatus further comprises a current limiting device, the current limiting device being operative to limit the amount of power that can be sent to the device across the network interface to the calculated current limit for that device.

20. An apparatus as in claim 14 wherein:
the power supply is an uninterruptible supply having a first power source and a second power source; and
the pre-defined maximum voltage slew rate is equal to the largest voltage slew rate of the power supply that could be caused by one of the first or second power sources failing.

* * * * *